(12) United States Patent
Ramp et al.

(10) Patent No.: US 11,046,283 B2
(45) Date of Patent: Jun. 29, 2021

(54) PROPELLANT CAGE AND PACKING ELEMENT FOR A TUBULAR INFLATOR

(71) Applicant: TRW Airbag Systems GmbH, Aschau a. Inn (DE)

(72) Inventors: Manfred Ramp, Waldkraiburg (DE); Georg Tautschnig, Vilsbiburg (DE)

(73) Assignee: TRW AIRBAG SYSTEMS GMBH, Aschau am Inn (DE)

( * ) Notice: Subject to any disclaimer, the term of this patent is extended or adjusted under 35 U.S.C. 154(b) by 112 days.

(21) Appl. No.: 16/410,241

(22) Filed: May 13, 2019

(65) Prior Publication Data

US 2019/0351863 A1      Nov. 21, 2019

(30) Foreign Application Priority Data

May 18, 2018 (DE) ..................... 10 2018 112 011.7

(51) Int. Cl.
  *B60R 21/264* (2006.01)
  *B60R 21/272* (2006.01)
  *B60R 21/26* (2011.01)

(52) U.S. Cl.
  CPC ........ *B60R 21/2644* (2013.01); *B60R 21/264* (2013.01); *B60R 21/2646* (2013.01); *B60R 21/272* (2013.01); *B60R 2021/26029* (2013.01)

(58) Field of Classification Search
  CPC .............. B60R 21/264; B60R 21/2644; B60R 21/2646; B60R 21/272; B60R 2021/26029
  See application file for complete search history.

(56) References Cited

U.S. PATENT DOCUMENTS

| 4,249,673 | A | * | 2/1981 | Katoh | ................. | B60R 21/2644 |
| | | | | | | 102/530 |
| 5,636,865 | A | * | 6/1997 | Riley | ................. | B60R 21/2644 |
| | | | | | | 280/728.2 |
| 5,660,412 | A | * | 8/1997 | Renfroe | ................ | B60R 21/272 |
| | | | | | | 280/737 |
| 5,970,880 | A | * | 10/1999 | Perotto | ............... | B60R 21/2644 |
| | | | | | | 102/531 |
| 6,167,808 | B1 | * | 1/2001 | Mramor | ................. | F42B 3/182 |
| | | | | | | 102/200 |
| 6,368,431 | B1 | * | 4/2002 | Mangum | ................. | C06B 45/10 |
| | | | | | | 102/530 |
| 6,877,436 | B2 | * | 4/2005 | Jung | ..................... | B60R 21/268 |
| | | | | | | 102/530 |
| 7,325,829 | B2 | * | 2/2008 | Kelley | ................. | B60R 21/272 |
| | | | | | | 280/736 |

(Continued)

FOREIGN PATENT DOCUMENTS

DE    112017002069    12/2018
JP     2007314102    12/2007

(Continued)

*Primary Examiner* — Laura Freedman
(74) *Attorney, Agent, or Firm* — Tarolli, Sundheim, Covell & Tummino LLP (57) ABSTRACT

A propellant cage (10) for a tubular inflator (100), especially for a tubular inflator (100) of an airbag module, for forming a propellant chamber (14) and a flow passage (15) of the tubular inflator (100). The propellant cage (10) is in the form of a propellant cage spiral spring (11) having a gas inlet-side end (12) and a gas outlet-side end (13), the gas inlet-side end (12) having a smaller cross-section than the gas outlet-side end (13).

24 Claims, 7 Drawing Sheets

(56) References Cited

U.S. PATENT DOCUMENTS

| | | | | |
|---|---|---|---|---|
| 7,363,863 | B2 * | 4/2008 | Engler | B60R 21/2644 |
| | | | | 102/530 |
| 7,658,405 | B2 * | 2/2010 | Gibbons | B60R 21/268 |
| | | | | 280/736 |
| 8,783,188 | B1 * | 7/2014 | Mayville | B60R 21/2644 |
| | | | | 102/530 |
| 9,051,226 | B2 * | 6/2015 | Mayville | C06D 5/00 |
| 9,205,802 | B1 | 12/2015 | Lang et al. | |
| 10,173,633 | B2 | 1/2019 | Last et al. | |
| 2003/0025313 | A1 * | 2/2003 | Sawa | B60R 21/2644 |
| | | | | 280/741 |
| 2009/0039628 | A1 | 2/2009 | Zengerle et al. | |
| 2011/0018243 | A1 | 1/2011 | Yano et al. | |
| 2017/0028964 | A1 * | 2/2017 | Bierwirth | B60R 21/26 |
| 2019/0047508 | A1 | 2/2019 | Esau et al. | |
| 2019/0077360 | A1 * | 3/2019 | Imai | B60R 21/2646 |
| 2019/0351864 | A1 * | 11/2019 | Hillmann | B60R 21/272 |

FOREIGN PATENT DOCUMENTS

| | | | |
|---|---|---|---|
| JP | 2008149837 | | 7/2008 |
| JP | 2011031763 | | 2/2011 |
| JP | 2017007456 A | * | 1/2017 |
| JP | 2017065373 A | * | 4/2017 |
| JP | 2017065452 A | * | 4/2017 |
| JP | 2018012415 A | * | 1/2018 |

* cited by examiner

PROPELLANT CAGE AND PACKING ELEMENT FOR A TUBULAR INFLATOR

RELATED APPLICATION

This application claims priority from German Application No. 10 2018 112 011.7, filed May 18, 2018, the subject matter of which is incorporated herein by reference in its entirety.

BACKGROUND OF THE INVENTION

The invention relates to a propellant cage for a tubular inflator, especially for a tubular inflator of an airbag module, in accordance with the preamble of claim 1. Further, the invention relates to a packing element for a tubular inflator, especially for a tubular inflator of an airbag module, in accordance with the preamble of claim 3. Further, the invention relates to a tubular inflator for an airbag module. The invention moreover deals with an airbag module including a tubular inflator of this type. In addition, the invention shows a vehicle safety system, an operating method of a tubular inflator and a method of manufacturing a tubular inflator.

A propellant cage comprising the features of the preamble of claim 1 is known, for example, from EP 2 471 692 B1.

In general, a propellant cage of an inflator fulfills plural functions. In the mounted state, the propellant cage delimits especially a propellant chamber in which propellant bodies are positioned. The propellant bodies may comprise for example propellant pellets, as shown in EP 2 471 692 B1. In this respect, the propellant cage serves for positioning the propellant bodies inside the inflator. At the same time, it is the purpose of the propellant cage to enable ignition gas to flow from an igniter unit into the propellant chamber. To this end, the known propellant cage on the one hand has a gas inlet opening which is arranged at an axial end of its tubular base member facing the igniter unit. Via the gas inlet opening ignition gas ejected from the igniter unit can first flow into the interior of the propellant cage. Furthermore, radially arranged through-holes are provided through which part of the inflowing ignition gas can flow to the outside of the propellant cage, concretely speaking into the propellant chamber formed around the propellant cage. In this way, the ignition gas gets into contact with the propellant bodies which are arranged as propellant bed in the propellant chamber. The propellant bodies are ignited by the hot ignition gas and release a propellant gas. In the known propellant cage, via the same gas through-openings through which the ignition gas has entered into the propellant chamber, the propellant gas flows into the interior of the propellant cage again and is then guided out of the propellant cage via a gas outlet opening axially opposed to the gas inlet opening.

It is another function of the propellant cage to forward a shock wave which is generated in the area of the gas inlet opening. The shock wave is formed by excess pressure forming within an ignition chamber when the igniter unit is ignited. Since the ignition chamber is longitudinally delimited in the axial direction by a bursting diaphragm, after activation of the igniter unit initially pressure is built up inside the ignition chamber. As soon as a predetermined pressure is exceeded, the bursting diaphragm ruptures and the pressurized ignition gas flows into the propellant cage. The sudden rupture of the bursting diaphragm causes formation of the shock wave which is to be guided longitudinally through the propellant cage in the axial direction.

The aforementioned functions are substantially fulfilled by the known propellant cage according to EP 2 471 692 B1. However, such design can be judged to be disadvantageous, because in the propellent cage the same radial gas flow openings are used for introducing the ignition gases into the propellant chamber and for discharging the released propellant gas from the propellant chamber, which may reduce the efficiency of ignition. In addition, the known propellant cage has some sharp edges formed in direct contact with the propellant pellets, which may be detrimental. Moreover, propellant cages of this type are sometimes difficult to manufacture. Furthermore, propellant cages of this type are in relation with a plurality of further components that are required to fix, on the one hand, the propellant cage and, on the other hand, the propellant bed. Further, low permeability of the hot igniter particles through radially arranged through-holes of the propellant cage will occur to some extent. As a consequence, disadvantageous ignition of the propellant pellets of the propellant bed may take place.

Against this background, it is an object of the present invention to state a propellant cage for an inflator which, on the one hand, allows improved gas conduit and, on the other hand, is easier to manufacture. Moreover, a developed propellant cage is to be designed so that the number of further required components in connection with a tubular inflator is reduced.

SUMMARY OF THE INVENTION

It is another object of the invention to state a developed packing element. Said packing element is intended to be designed especially so that it may be operatively connected to a developed propellant cage. In other words, the developed packing element is to be compatible with a developed propellant cage.

It is a further object of the invention to state a tubular generator comprising a propellant cage according to the invention and/or a packing element according to the invention.

Moreover, it is an object of the invention to state an airbag module as well as a vehicle safety system comprising a tubular inflator as well as a method of operating a tubular inflator.

In addition, it is an object of the present invention to state a developed method of manufacturing a tubular inflator.

In accordance with the invention, this object is achieved with respect to the propellant cage by the subject matter of claim 1, with respect to the packing element by the subject matter of claim 3, with respect to the tubular inflator by the subject matter of claim 8, with respect to the airbag module by the subject matter of claim 14, with respect to the vehicle safety system by the subject matter of claim 15, with respect to the operating method by the subject matter of claim 16 and with respect to the manufacturing method by the subject matter of claim 18.

Thus, the invention is based on the idea to state a propellant cage for a tubular inflator, especially for a tubular inflator of an airbag module, the propellant cage serving for forming a propellant chamber and a flow passage of the tubular inflator. According to the invention, the propellant cage is in the form of a propellant cage spiral spring having a gas inlet-side end and a gas outlet-side end, with the gas inlet-side end having a smaller cross-section than the gas outlet-side end.

The gas inlet-side end of the propellant cage spiral spring is preferably formed by at least one spring winding. The gas outlet-side end of the propellant cage spiral spring is preferably formed by at least one spring winding of the propellant cage spiral spring. Both in connection with the gas inlet-side end and with the gas outlet-side end it is possible to design the ends by plural spring windings. In particular, the gas inlet-side end has a smaller cross-section through which gas can flow than the gas outlet-side end, when viewed perpendicularly to the longitudinal axis of the propellant cage spiral spring.

Designing the propellant cage as a propellant cage spiral spring on the one hand offers the advantage that such propellant cage spiral spring is very easy to manufacture. Further, a propellant cage spiral spring has no sharp edges at least in the areas in which propellant bodies are adjacent to the propellant cage spiral spring.

The propellant cage spiral spring is preferably made from round wire. Due to the clearance formed between spring windings it is possible to form radially disposed through-openings. Preferably, the propellant cage spiral spring has a spiral shape formed in a longitudinal extension in the axial direction. The clearance between two spring windings forms at least one radial through-opening.

Preferably, a clearance of spring windings in the area of the gas outlet-side end is smaller than the clearance of spring windings in the area of the gas inlet-side end and/or of spring windings of a central spring portion of the propellant cage.

Due to a clearance of spring windings in the area of the gas outlet-side end that is smaller as compared to further portions of the propellant cage spiral spring, guiding of a shock wave through the flow passage of the propellant chamber, especially of the propellant cage, is accelerated. Additional deflection of the generated shock wave is avoided.

For the purpose of explanation: a shock wave released especially in a tubular inflator serves for breaking or for opening a further bursting diaphragm disposed at the outlet end of the tubular inflator so that gas provided in the tubular inflator may flow into a connected airbag. In so far, it is especially relevant to the functioning of such tubular inflator that a uniform stable shock wave is formed. It is especially required that the stability of the shock wave is retained along its entire travel through the inflator to the further bursting diaphragm.

A gas inlet-side end of a propellant cage is especially understood to be the end of the propellant cage spiral spring which in a mounted state of the propellant cage in an inflator, especially a tubular inflator, is closest to the igniter unit there or is associated with the latter. The gas outlet-side end is understood to be the opposite end of the propellant cage spiral spring. In other words, a gas inlet-side end of a propellant cage may be understood to be the end of the propellant cage spiral spring through which or into which hot gas and/or hot ignition particles, especially from an igniter unit, flow in an operating state of the propellant cage spiral spring. The gas outlet-side end then is understood to be the end of the propellant cage axially opposed to the gas inlet-side end. Especially, the gas outlet-side end is the end of the propellant cage spiral spring which delimits the propellant bed in the flow direction toward a gas chamber or compressed gas chamber.

In a preferred embodiment of the invention, the propellant cage, i.e. the propellant cage spiral spring, includes a substantially funnel-shaped or trumpet-shaped portion. The funnel-shaped or trumpet-shaped portion widens especially toward the gas outlet-side end. It has been shown that by the funnel-shaped or trumpet-shaped portion, especially if said portion widens toward the gas outlet-side end, especially proper stabilization of a generated shock wave is obtained.

The shock wave propagates in the direction of the longitudinal axis inside the propellant cage, with the funnel-shaped portion causing the shock wave to stabilize. The shock wave widening along the funnel-shaped portion or the trumpet-shaped portion therefore is especially robust. Moreover, it has turned out that the stability of the shock wave is maintained even when it has left the propellant cage. Thus, the funnel-shaped or trumpet-shaped portion widening toward the gas outlet-side end helps to stabilize a shock wave to such extent that it is especially stable and robust even in the further course inside a tubular inflator until it impinges on an outlet-side bursting diaphragm. This increases the operating safety of a tubular inflator.

Within the scope of the present invention, the term "funnel-shaped" does not necessarily denote a frustum shape having a smooth circumferential surface. Rather, the funnel-shaped portion may be curved in the direction of the longitudinal axis. For a stable design of a shock wave it is beneficial when the funnel-shaped portion or the trumpet-shaped portion widens toward the gas outlet-side end of the propellant cage spiral spring. The inside diameter of the propellant cage spiral spring preferably increases from the gas inlet-side end toward the gas outlet-side end.

Moreover, it is possible for the propellant cage, i.e. the propellant cage spiral spring, to include a collar portion. The collar portion may be formed especially as an inside-out turned portion of the propellant cage spiral spring. Preferably, the collar portion is formed at the gas outlet-side end of the propellant cage spiral spring. The collar is advantageously formed at the gas outlet-side end of the propellant cage spiral spring. In an especially preferred manner, also the collar is formed by at least one spring winding.

The at least one lateral gas flow opening of the propellant cage spiral spring is preferably formed as a coherent gas flow opening, the gas flow opening being in the form of a spiral spring. The opening cross-section of the lateral gas flow opening is formed by the respective clearance of the spring windings of the propellant cage spiral spring relative to each other. Preferably, the clearances of the spring windings relative to the propellant bodies of the propellant bed are configured so that they do not enter into the flow passage of propellant cage spiral spring. In other words, the size and the cross-section of the lateral gas flow opening(s) is smaller than the cross-section of the size of the propellant bodies forming the propellant bed, especially of the propellant pellets.

The design of the propellant cage in the form of a propellant cage spiral spring according to the invention advantageously keeps the centrally defined area of shock wave front initiation free and moreover retains the propellant bed and, resp., the propellant bodies forming the propellant bed at a defined position throughout the service life of the tubular inflator. Due to the advantageous use of a round wire for forming the propellant cage spiral spring as little propellant as possible will be abraded.

Due to the configuration of at least partial clearances between the spring windings, the propellant cage spiral spring is simultaneously permeable to igniter particles so that in a trigger situation the propellant bed can be selectively ignited. Further advantageous characteristics of the propellant cage spiral spring are, on the one hand, the low dead volume and, on the other hand, the low weight of the propellant cage spiral spring. Further, such propellant cage spiral spring can be especially easily manufactured.

When designing the propellant cage as a propellant cage spiral spring and with the preferably related embodiment of a lateral gas flow opening in spiral spring shape, a large gas flow opening area in proportion to the material of the propellant cage spiral spring is provided. The flow cross-section of the lateral gas flow opening(s) is increased. This results in higher efficiency when igniting propellant bodies in a propellant chamber which surrounds the propellant cage.

Of preference, the propellant cage in the form of a propellant cage spiral spring is made from metal to be capable of resisting the high temperatures of the ignition gas.

Another, especially independent aspect of the invention relates to a packing element for a tubular inflator, especially for a tubular inflator of an airbag module, for fixing a propellant bed present in a propellant chamber of the tubular inflator. The packing element is formed at a propellant bed-side end to receive, especially to partially enclose and/or to support a propellant cage.

Preferably, the packing element is formed at the propellant-bed side end so that an afore-described propellant cage according to the invention can be received, especially partially enclosed and/or supported. The packing element may be formed at a propellant bed-side end in particular in such way that a gas inlet-side end of a propellant cage, especially of a propellant cage spiral spring, can be received, especially partially enclosed.

In other words, the cross-section and, resp., the cross-section through which gas may flow and, resp., an appropriately formed flow opening of the propellant bed-side end of the packing element may be larger than the cross-section and, resp., the cross-section through which gas may flow and, resp., an appropriately formed flow opening of the gas inlet-side end of the propellant cage so that the packing element at the propellant bed-side end receives, especially partially encloses, at least portions of the gas inlet-side end of the propellant cage. Accordingly, the propellant bed-side end of the packing element and the gas inlet-side end of the propellant cage need not contact each other. Rather, the gas inlet-side end of the propellant cage, especially of the propellant cage spiral spring, may be inserted into the propellant bed-side end of the packing element. In other words, the gas inlet-side end of the propellant cage may be introduced or inserted into the propellant bed-side end of the packing element so far in the axial direction that the propellant cage and the packing element are overlapping at their respective ends over a certain axial length. Alternatively, or additionally, it is possible that the propellant bed-side end of the packing element supports the gas inlet-side end of the propellant cage. In so doing, the packing element and the propellant cage contact each other.

Preferably, between the packing element and the propellant cage an advantageous operative connection is established, wherein contact between the two elements, i.e. the packing element and the propellant cage, is not mandatory. The packing element is preferably configured so that no further components are required for fixing the propellant bed and, resp., the propellant cage.

Preferably, the packing element is in the form of a packing spiral spring which in the axial direction includes plural portions of different diameters and/or clearances of spring windings. Preferably, the packing spiral spring has three different portions. These are a first igniter carrier-side portion, a second central portion and a frontal end portion. The central portion consequently is formed between the igniter carrier-side portion and the frontal end portion. The frontal end portion of the packing spiral spring comprises the propellant bed-side end of the packing element.

Preferably, the central portion is tapered and is widened toward the frontal end portion. In other words, the cross-section and, resp., the cross-section of the packing spiral spring, through which gas flows, increases in the central portion toward the frontal end portion. Of preference, the spring winding portion in the central portion is smaller than in the igniter carrier-side portion.

Moreover, it is possible that the spring winding clearance in the frontal end portion is larger than the spring winding clearance in the central portion of the packing spiral spring, and especially the spring winding clearance in the frontal end portion may be smaller than the spring winding clearance of the first igniter carrier-side portion. The packing spiral spring is preferably configured so that it can be slid over a housing portion of the igniter unit and/or over a cap of the tubular inflator so that the igniter carrier-side portion of the packing spiral spring abuts on a housing portion of the igniter unit. The inside diameter of the packing spiral spring further is formed in the igniter carrier-side portion of the packing spiral spring so that said portion can be guided over the housing of the igniter unit and, resp., over the cap of the tubular inflator. Preferably, between the housing of the igniter unit and the igniter carrier-side portion of the packing spiral spring merely a small clearance is formed. The clearance is selected so that, in a trigger situation of an inflator or tubular inflator in which the packing spiral spring is incorporated, the igniter carrier-side portion is movable in the direction of the longitudinal axis. The three afore-described axially successive portions of the packing spiral spring are configured especially in such a way that, on the one hand, a sufficient axial hold-down force acts on the propellant bed to be fixed as well as a proper fixing force acts on the propellant cage to be fixed. Moreover, the packing spiral spring may serve, at least partially, as a barrier to possible welding spatters that may naturally occur when a closure member or closure cap or igniter unit is welded onto the tubular housing of a tubular inflator.

The igniter carrier-side portion of the packing spiral spring has a relatively large clearance regarding the spring windings to ensure appropriate long axial spring travels for propellant filling tolerances and, resp., an axial travel compensation for natural setting behavior of a propellant bed throughout the service life of the inflator.

The central portion of the packing spiral spring is preferably tapered and is relatively tightly wound. The spring winding clearance in the central portion is thus extremely small. Preferably, the spring windings of the central portion of the packing spiral spring abut on and, resp., contact each other. The central portion serves especially as a barrier to possible weld spatters which may occur during said welding of a closure member onto the tubular housing of a tubular inflator and, resp., onto the compressed gas chamber. Thus, the central portion prevents welding spatters from entering into the area of the already filled propellant bed.

In the frontal end portion of the packing spiral spring the spring winding clearance is preferably configured so that, in the case of activation or in a trigger situation of the tubular generator, there is sufficient passing space and, resp., a sufficiently large flow opening or cross-sectional area formed so that sufficiently hot ignition particles and/or ignition gases may enter through the flow opening or cross-sectional area resulting from the spring windings of the frontal end portion and/or from the clearances of the spring windings relative to each other into the propellant bed of the propellant chamber of a tubular inflator so that the propellant bed can be ignited as intended.

In another embodiment of the invention, the packing element has a radial ring element at which an axially extending sleeve is formed. It is possible that the packing element is merely formed of the radial ring element including the axially extending sleeve. The sleeve preferably extends, in the mounted state of the packing element, into a tubular inflator in the direction of the igniter carrier. In other words, the axially extending sleeve forms the igniter carrier-side end of the packing element.

In another embodiment of the invention, the sleeve includes at least one, preferably at least two, radially inwardly extending tab(s). Said tab preferably serves as a bearing face for a gas inlet-side end of a propellant cage, especially for the gas inlet-side end of a propellant cage spiral spring.

Preferably, a packing element of this type comprising a radial ring element is screwed or clipped onto the gas inlet-side end of the propellant cage, especially the propellant cage spiral spring, until the radial ring element fixes the propellant bed as intended and, resp., the propellant bed is mechanically biased. The at least one tab, preferably the at least two tabs, preferably is/are intended to enable the packing element to be screwed or clipped onto the propellant cage, especially onto the propellant cage spiral spring. Moreover, the at least one tab serves as an axial protection or a stop in the desired final position of the packing element.

The preferably axially extending sleeve preferably serves as a guide for screwing or clipping onto the propellant cage. In the desired final position of the packing element, the axial sleeve further serves as a protection or stabilizer for positioning the packing element.

The radial ring element preferably has such outside diameter and, resp., outside cross-section which approximately corresponds to the inside diameter of the tubular housing of the tubular inflator and, resp., to the tubular housing of a combustion chamber. This allows the radial ring element to be clip-fastened inside the tubular housing. It is also imaginable that an appropriately small clearance or a play is provided between the radial ring element and the inner surface of the tubular housing so that mounting of the ring element is facilitated but still no propellant bodies may pass through the small clearance or the play in the completely assembled state.

One independent aspect of the invention relates to a tubular inflator for an airbag module, especially a hybrid inflator.

The tubular inflator includes a tubular housing and a propellant cage, wherein the propellant cage may be configured according to the foregoing description relating to the propellant cage according to the invention. The propellant cage is arranged inside the tubular housing and at least in portions delimits a propellant chamber by the tubular housing. The propellant chamber may be especially hollow-cylindrical. In the propellant chamber propellant bodies, especially propellant pellets, may be positioned. The propellant cage further forms a flow passage within the tubular inflator. This means especially that the propellant cage in its interior comprises over a certain axial length a passage-shape space through which gas, especially ignition gas and, resp., ignition particles which can be generated by an igniter, can flow substantially unhindered. Moreover, the tubular inflator according to the invention comprises a packing element that may be designed in accordance with the foregoing description concerning the packing element according to the invention.

The gas outlet-side end of the propellant cage is preferably positioned to rest on a bead of the tubular housing of the tubular inflator (100), the bead being formed in an igniter-side front third, especially in an igniter-side front quarter, especially in an igniter-side front fifth, of the tubular housing. The gas inlet-side end of the propellant cage, on the other hand, points in the direction of the igniter unit of the tubular inflator. Concretely, in the tubular housing of the tubular inflator the bead may be in the form of an inwardly facing, especially radially circumferential, tapering which may be especially in the form of a crimped or rolled portion. On an inner circumference of the tubular housing, the tapering thus forms an annular bead against which the gas outlet-side end of the propellant cage, especially gas outlet-side spring windings of the propellant cage spring, may abut.

In the tubular housing moreover an igniter unit may be arranged. It is possible that the gas inlet-side end of the propellant cage rests on the igniter unit, in particular on a cap pertaining to the igniter unit. Further, it is possible that the igniter unit and/or the cap of the tubular inflator is/are inserted in the gas inlet-side end of the propellant cage, especially of the propellant cage spiral spring. Thus, the ignition gas and/or ignition particles flowing out of the igniter unit in the operating case and, resp., upon activation of the tubular inflator are especially caused to flow into the propellant cage. Unless the gas inlet-side end of the propellant cage is directly adjacent to the igniter unit, the packing element is preferably configured such that the gas inlet-side end of the propellant cage can be inserted into and/or bears against the propellant bed-side end of the packing element. Of preference, in this embodiment, i.e. unless the gas inlet-side end of the propellant cage is adjacent to the igniter unit or if the igniter unit is inserted at least in portions into the gas inlet-side end of the propellant cage spiral spring, the packing element takes the already described shape of a packing spiral spring.

Depending on the configuration of the propellant cage, the shape and, resp., embodiment of the packing element thus has to be chosen, which is implemented in such a way that the ignition gas and/or ignition particles flowing out of an igniter unit may flow into the flow passage of the propellant cage.

Preferably, the tubular inflator according to the invention can be operated on the principle of a shock wave. In the case of activation, the igniter of the tubular inflator is triggered or activated, with the igniter releasing ignition gas or ignition particles, especially by opening a frontal area of the igniter, wherein then a first bursting element, especially a first bursting diaphragm of the igniter unit constituting an inlet-side bursting diaphragm of the tubular inflator is opened. Already upon triggering the igniter, i.e. upon opening of the frontal area of the igniter or upon opening the first bursting element, a shock wave and, resp., a shock wave front is initiated that extends and, resp., propagates in the direction of a longitudinal axis through the inflator, especially in the direction of a longitudinal axis through a compressed gas chamber of the inflator, and opens an end-side second burst element, especially an outlet-side bursting diaphragm, to guide the generated gas or inflation gas out of the tubular inflator preferably toward an inflatable airbag, which is preferably performed via a diffuser.

It is possible that the gas inlet-side end of the propellant cage and the propellant bed-side end of the packing element are substantially formed in a joint plane. It is possible that the gas inlet-side end of the propellant cage and the propellant bed-side end of the packing element contact each other or are formed to be adjacent each other. Of preference, in said embodiment of the invention, the gas inlet-side end of the propellant cage and the propellant bed-side end of the packing element are located substantially in the plane of the end face of a cap of the tubular inflator which may also be part of the igniter unit.

In another embodiment of the invention, it is possible that the propellant cage and the packing element are positioned to be overlapping at least in portions in the axial direction. In other words, the gas inlet-side end of the propellant cage and the propellant bed-side end of the packing element may be overlapping at least in portions when extending in the direction of the longitudinal axis.

The packing element can be screwed and/or fitted and/or clipped onto the propellant cage. Due to such configuration of the two elements by a directly acting connection to each other, a tubular inflator which is reduced to a minimum of required parts as regards the required propellant cage and the required packing element may be provided. In addition, those component parts are provided which are extremely simple to manufacture.

The clearances of the spring windings of the propellant cage spiral spring can be designed especially for forming a flow passage and especially for forming a propellant chamber in relation to propellant bodies, especially in relation to the size of the propellant bodies, of a propellant bed in such way that the propellant bodies cannot enter into the flow passage. The flow passage thus is free from propellant bodies. In this way, excellent guidance and formation of the passing shock wave front is enabled.

As indicated above, it is preferred that gas-generating propellant bodies are disposed in the propellant chamber. The gas-generating propellant bodies may be constituted especially by propellant pellets which may be present as compressed or extruded molded bodies or else as granules. During burn-up, the propellant bodies preferably generate a propellant gas and, resp., inflating gas that causes or assists the inflation of an airbag.

The gas housing of the inflator advantageously forms a compressed gas tank that is filled with biased compressed gas. The compressed gas may be present as a single gas or else as a gas mixture, especially consisting of helium, argon, nitrogen or oxygen, at a pressure of 500-800 bars and, upon activation of the inflator, may be released, in addition to the propellant gas, and introduced to an airbag. In this way, the compressed gas assists in inflating the airbag.

Another independent aspect of the invention relates to an airbag module comprising a tubular inflator, an airbag inflatable by the tubular inflator and a securing means for mounting the airbag module to a vehicle. The tubular inflator is designed as described before.

Further, within the scope of the present application, a vehicle safety system, especially for protecting a person such as a vehicle occupant or a pedestrian, is disclosed and claimed. The vehicle safety system according to the invention comprises a tubular inflator, an airbag inflatable by the latter as part of an airbag module and an electronic control unit by means of which the tubular inflator can be activated in the event of a trigger situation. In the vehicle safety system according to the invention, the tubular inflator is designed according to the afore-described manner regarding the tubular inflator according to the invention.

Another independent aspect of the invention relates to a method of operating a tubular inflator, especially a tubular inflator according to the invention. The operating method according to the invention comprises the following steps of:

a) triggering an igniter unit for generating ignition gas inside an ignition chamber;
b) axially introducing the ignition gas to a flow passage encompassed by a propellant cage;
c) discharging part of the ignition gas via at least one lateral gas flow opening of the propellant cage into a propellant chamber radially inwardly delimited by the propellant cage;
d) igniting propellant bodies, especially propellant pellets, in the propellant chamber by the ignition gas, with a propellant gas being generated; and
e) discharging the propellant gas from the propellant chamber into a gas chamber, especially a compressed gas chamber.

During step b) a shock wave front can be initiated which propagates in the direction of the longitudinal axis directly through the gas chamber, especially the compressed gas chamber, and opens a bursting element formed at the longitudinally axial end of the gas chamber, especially an outlet-side bursting diaphragm.

In particular, in step e) the propellant gas, especially a portion thereof, can be discharged via a gas flow opening of the propellant cage which is different from the gas flow opening of the propellant cage for discharging a portion of the igniter gas into the propellant chamber in step c). Accordingly, especially the propellant gas, in particular a portion thereof, can be discharged via a gas flow opening of the propellant cage which is positioned axially downstream in a flow direction and/or radially further outwards as compared to the gas flow opening of the propellant cage when a portion of the igniter gas is discharged into the propellant chamber in step c).

Moreover, the invention relates to a method of manufacturing a tubular inflator, especially a tubular inflator according to the invention. The manufacturing method comprises the following steps of:

i) inserting the propellant cage into the tubular housing of the tubular inflator such that the gas outlet-side end of the propellant cage rests on a bearing element, especially on a bead;
j) filling propellant bodies, especially propellant pellets, into a space formed by the propellant cage and the tubular housing, especially a propellant chamber, and forming a propellant bed;
k) placing the packing elements onto the propellant bed and axially biasing the propellant bed.

Moreover, the manufacturing method according to the invention may comprise the step l). In step l) a/the gas chamber, especially a/the compressed gas chamber, is filled with a gas or a gas mixture, step l) being preferably carried out before or after step k).

The gas or gas mixture may be helium or argon or nitrogen or oxygen or a mixture of the gases. Preferably, the pressure within the compressed gas chamber is 500 to 800 bars, especially 550 bars.

In step k) the packing element may be part of an assembly unit and may be placed onto the propellant bed together with the assembly unit. Preferably, the assembly comprises the packing element as well as an inflator closure member in the form of a cap, said cap comprising the igniter with the corresponding igniter carrier and/or being connected to said components.

If the packing element is part of an assembly unit, step l), i.e. filling the gas chamber or, resp., the compressed gas chamber with a gas or gas mixture, can follow step j).

Further, the method of manufacturing a tubular inflator according to the invention may comprise step m). Accordingly, it is possible that the gas inlet-side end of the propellant cage is elongated. Elongating is performed in a direction opposite to the bearing element. Step m) is preferably carried out following step j), i.e. after filling propellant bodies. Preferably, in step m) a tool having a stopper device is used so that during elongation of the gas inlet-side end the propellant cage is held in position relative to the bearing element. In other words, with the aid of a tool having an axial stopper device the propellant cage, especially the propellant cage spiral spring with the already filled propellant bodies is to be retained in position, wherein merely the gas inlet-side end is elongated.

In step j) the propellant cage, especially the propellant cage spiral spring, is held in a stable position due to the filled propellant bodies and the thus formed propellant bed so that the gas inlet-side end of the propellant cage is prevented from being inadvertently radially displaced, especially offset.

After filling with propellant and, resp., after forming a propellant bed, the packing element, especially a packing spiral spring is axially placed and pressed onto the propellant bed so that the propellant bodies and, resp., the propellant bed are/is biased. Preferably, the propellant bed-side end of the packing spiral spring is guided over the gas inlet-side end of the propellant cage spiral spring so that the two end portions of the spiral springs are formed to be overlapping along a particular axial length. Subsequently the gas chamber, especially the compressed gas chamber, can be filled with compressed gas.

If in step k) the packing element is screwed and/or fitted and/or clipped onto the propellant cage, the packing element comprises especially a radial ring element. Furthermore, an axially extending sleeve may be formed at the radial ring element. Such packing element may be mounted in such a way that, according to step j), a propellant cage spiral spring is elastically elongated so that the outer diameter of the propellant cage spiral spring is reduced in the elongated or stretched area so that the radial ring element or, resp., the radial ring element especially together with the axially extending sleeve can be axially attached to or screwed onto the propellant cage spiral spring. Subsequent elastic relief or little upsetting of the propellant cage spiral spring then would increase the previously reduced outer diameter of the propellant cage spiral spring in the machined area again such that the radial ring element or, resp., the radial ring element preferably together with the axially extending sleeve remains fixed to the applied final position.

BRIEF DESCRIPTION OF THE DRAWINGS

Hereinafter, the invention shall be illustrated in detail by way of example embodiments with reference to the enclosed schematic drawings, wherein:

FIG. 2b shows an enlarged view of the igniter-side portion of the tubular inflator according to FIG. 2a;

FIG. 3b shows an enlarged view of the igniter-side portion of the tubular inflator according to FIG. 3a.

DESCRIPTION

Hereinafter, like reference numbers are used for like and equally acting parts.

Figure 1A:
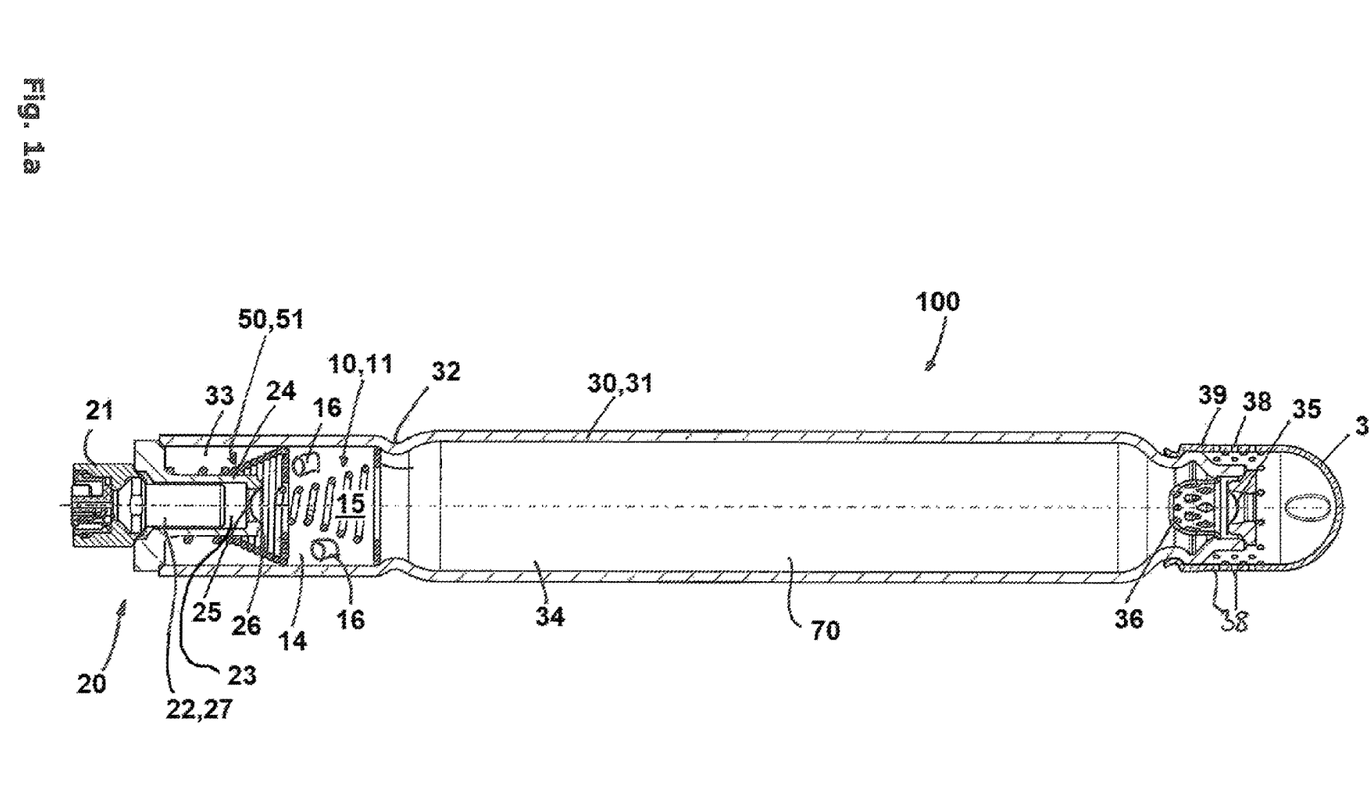
FIG. 1a shows a longitudinal section view across a tubular inflator comprising a first embodiment of a propellant cage according to the invention and a first embodiment of a packing element according to the invention.

FIG. 1a illustrates a longitudinal section across a tubular inflator 100, wherein the mounting situation of a propellant cage 10 according to the invention and of a packing element 50 according to the invention is to be shown. The tubular inflator 100 comprises a compressed gas tank 30 forming a housing 31 of the tubular inflator 100. The compressed gas tank 30 takes a substantially tubular shape and in an idle position, i.e. a non-activated situation, of the tubular inflator 100 comprises a biased compressed gas or a compressed gas mixture at a pressure value of 300 bars to 800 bars, especially 550 bars at room temperature.

A bead 32 of the housing 31 divides the compressed gas tank 30 into a first portion 33 in which an igniter unit 20, the propellant cage 10 as well as the packing element 50 are disposed. A second portion 34 of the compressed gas tank 30 is substantially free of built-in parts and is used to receive a major part of the biased compressed gas. The compressed gas thus is present both in the first portion 33 and in the second portion 34 of the compressed gas tank 30, at least in respective portions there.

At an outlet-side end of the compressed gas tank 30 and, resp., of the housing 31 an outlet-side bursting diaphragm 35 is disposed. The term "outlet-side end" in this context is especially intended to reveal that an area is concerned which is provided for discharging or releasing propellant gas and, resp., inflation gas which is to be made available for inflation of an airbag (not shown) outside the inflator as intended. The outlet-side bursting diaphragm 35 closes the compressed gas tank 30, especially in a gas-tight manner. A filter screen 36 is arranged upstream of the outlet-side bursting diaphragm 35. The term "upstream" relates, in accordance with the invention, to a position which with respect to gas flow during operation of the tubular inflator is positioned upstream, viz. in the direction of the igniter unit 20. The filter screen 36 filters particles that are not intended to leave the tubular inflator 100.

At the outlet-side end of the compressed gas tank 30 and, resp., of the housing 31, furthermore a diffuser 37 is arranged. The diffuser 37 includes a diffuser cap 39 which is connected by crimping to the housing 31 of the tubular inflator. The diffuser cap 39 comprises outlet openings 38 which extend substantially radially outwardly. Via the outlet openings 38 released gas or, resp., inflation gas may flow into a connected airbag (not shown) after opening the outlet-side bursting diaphragm 35.

At the inlet-side end of the compressed gas tank 30 and, resp., of the housing 31 an igniter unit 20 is arranged. Concretely speaking, the igniter unit 20 is inserted in the first portion 33 of the compressed gas tank 30 which is separated from the second portion 34 of the compressed gas tank 30 by the bead 32. The igniter unit 20 comprises an igniter carrier 21 and an igniter 22. The igniter 22 includes electric terminals for connection to an electronic control unit and is a known pre-fabricated component having an axial longitudinal extension, as is clearly shown by the igniter cap 27 dedicated to the igniter 22. The igniter 22 comprises, in its interior, one or more pyrotechnic charge(s) or, resp., ignition charge(s) which in the operating case can be ignited by an electric activation signal on the basis of the electronic control unit. The electronic control unit is preferably provided on the vehicle-side and enables the tubular inflator 100 to be activated in a predetermined trigger situation. A cap 24 having an inlet-side bursting diaphragm 25 may be considered to further belong to the igniter unit 20.

The cap 24 made from metal is connected to the igniter carrier 21, preferably welded to the latter and at least partially surrounds the igniter 22 and, resp., the igniter cap 27 thereof inserted and retained in the igniter carrier 21. Accordingly, the cap 24 extends axially beyond the igniter 22 and, resp., the igniter cap 27 in a direction away from the igniter carrier 21 so as to form an igniter chamber 23 with the space surrounding the igniter 22 and, resp., the igniter cap 27. At the end face 26 of the cap 24 facing away from the igniter carrier 21 an opening is present which is closed especially in a gas-tight manner by an inlet-side bursting diaphragm 25. Especially the inlet-side bursting diaphragm 25 is connected, especially welded, to the cap 24 radially circumferentially on the outside of the cap 24. The inlet-side bursting diaphragm 25 could alternatively be formed integrally with the cap 24, especially as an area of a corresponding frontal end of the cap 24 so that the cap 24 in this case includes no opening to be closed, but that an opening can be formed only by rupture or local destruction of the cap 24 in this area. The cap 24, especially the inlet-side bursting diaphragm 25, separates the igniter unit 20 from a gas-filled interior of the compressed gas tank 30. Upon activation of the tubular inflator 100 and ignition of the igniter 22, excess pressure which will finally lead to opening or rupturing or destroying the inlet-side bursting diaphragm 25 and, resp., the corresponding frontal area of the cap 24 is formed in the ignition chamber 23. The hot ignition gas and/or hot ignition particles thus formed in the ignition chamber 23 can in this way leave the ignition chamber 23 in the direction of the outlet-side bursting diaphragm 35.

In the first portion 33 of the compressed gas tank 30 moreover the propellant cage 10 as well as the packing element 50 are arranged. The propellant cage 10 is a propellant cage spiral spring 11. The propellant cage 10 and, resp., the propellant cage spiral spring 11 together with the tubular housing 31 forms an interstice which is referred to as propellant chamber 14. Inside the propellant cage spiral spring 11, on the other hand, a flow passage 15 is formed which is substantially free from flow obstacles so that an especially axially extending gas flow and/or an axially propagating shock wave front may pass unhindered. In the propellant chamber 14 a propellant bed is formed which is constituted by the propellant bodies 16 schematically indicated in FIG. 1b. The propellant bed and, resp., the respective propellant bodies occupy substantially the entire propellant chamber 14, wherein naturally appropriate free spaces or interstices are forming.

It is further evident from FIG. 1a that the bead 32 is formed in an igniter-side front quarter of the tubular housing 31.

The packing element 50 is a packing spiral spring 51 in the shown example.

Figure 1B:
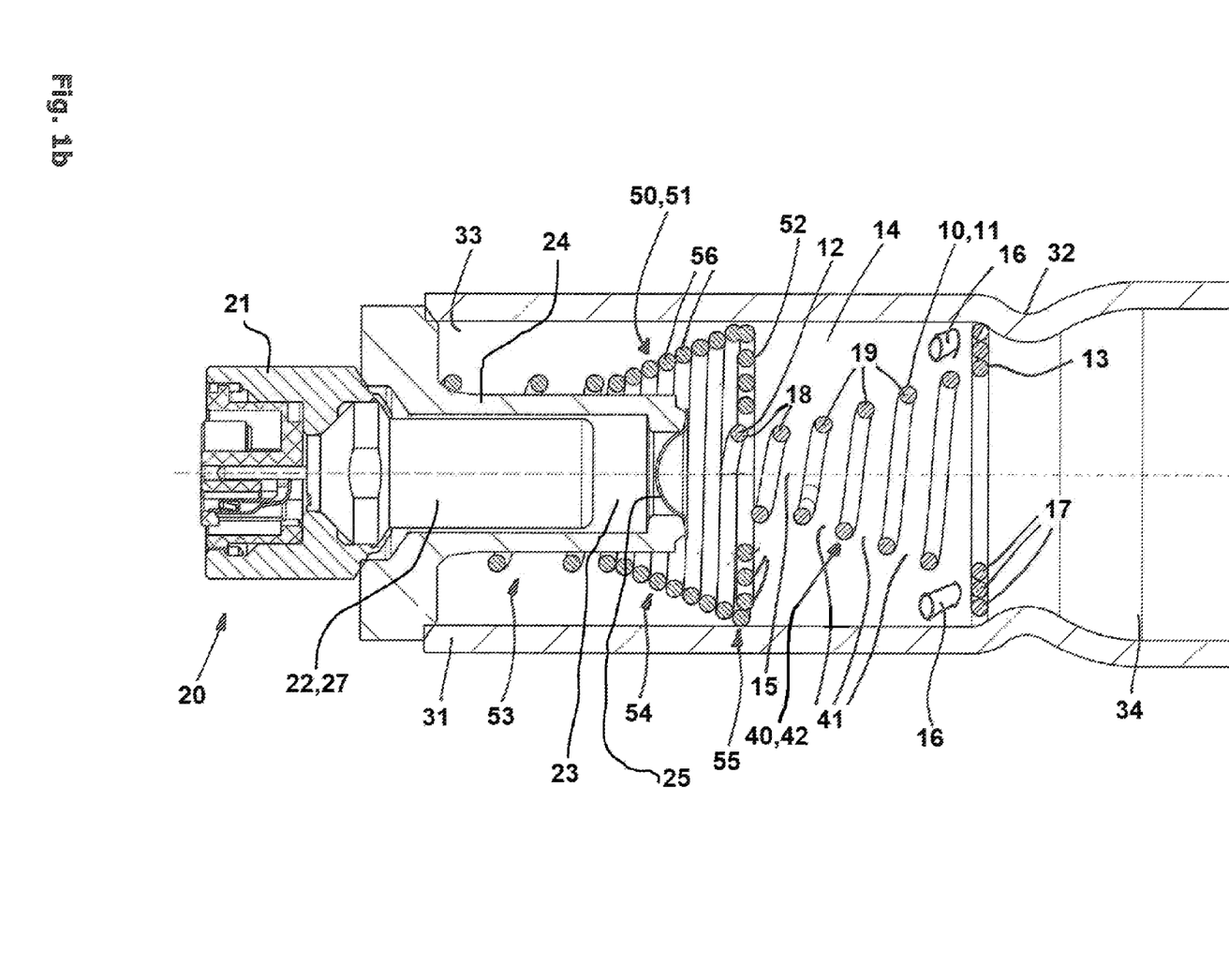
FIG. 1b shows an enlarged representation of the igniter-side portion of the tubular inflator.

Details regarding the propellant cage spiral spring 11 as well as regarding the packing spiral spring 51 can be taken from the enlarged view of FIG. 1b. The propellant cage spiral spring 11 includes a gas inlet-side end 12 and a gas outlet-side end 13. The gas outlet-side end 13 of the propellant cage spiral spring 11 rests on the already mentioned bead 32 of the housing 31. The cross-section of the gas inlet-side end 12 pointing in the direction of the igniter unit 20 is smaller than the cross-section of the gas outlet-side end 13. Accordingly, the term "cross-section" especially means the cross-section through which gas can flow, when viewed perpendicularly to the longitudinal axis of the propellant cage spiral spring 11.

It is evident that the propellant cage spiral spring 11 is continuously made from round wire material. The propellant cage 10 thus has no sharp edges along its axial extension. Moreover, it is obvious that the clearance of spring windings 17 in the area of the gas outlet-side end 13, especially in the radial direction, is smaller than the clearance of spring windings 18 in the area of the gas inlet-side end and of spring windings 19 of a central spring portion 40.

In particular with the aid of the clearance of spring windings 19 of the central spring portion 40, a continuous lateral gas discharge opening 41 having an axial spiral spring-type extension is formed. The clearances of the spring windings 19 are configured so that the propellant bodies 16 located in the propellant chamber 14 cannot enter into the flow passage 15.

The gas outlet-side end 13 of the propellant cage spiral spring 11 is formed by three radially adjacent spring windings 17. Preferably, between said spring windings 17 there is formed no clearance or merely a very small clearance so that no gas or merely a small gas portion can get through or between the spring windings 17 into the second portion 34 of the compressed gas tank 30. Accordingly, a or, resp., the shock wave or shock wave front passing through the destroyed inlet-side bursting diaphragm 25 into the flow passage 15 and, resp., axially propagating in the latter is not laterally deflected or only a very little portion thereof is laterally deflected. The shock wave thus enters directly into the second portion 34 of the compressed gas tank 30. The propellant cage spiral spring 11 further takes a funnel shape or conical shape so that the shock wave may laterally propagate in the flow passage 15.

Furthermore, the packing element 50 which is in the form of a packing spiral spring 51 is shown. The packing spiral spring 51 is configured at its propellant bed-side end 52 to receive the propellant cage 10 and to support the propellant bed located in the propellant chamber 14. The gas inlet-side end 12 of the propellant cage spiral spring 11 is inserted in the propellant bed-side end 52 of the packing spiral spring 51, especially axially inserted so far that a partial area of the gas inlet-side end 12 of the propellant cage spiral spring 11 extends into the interior of the packing spiral spring 51.

The packing spiral spring 51 substantially has three portions. These are a first igniter carrier-side portion 53, a second central portion 54 and a frontal end portion 55.

The spring windings in the igniter-side portion 53 of the packing spiral spring 51 have a relatively large clearance. This helps to guarantee sufficiently large axial spring travels for propellant filling tolerances and, resp., axial travel compensations throughout the service life of the inflator. The igniter carrier-side portion 53 of the packing spiral spring 51 is laterally adjacent to the cap 24 and, resp., to the outer shell thereof. The central portion 54 is tapered and widens in the direction of the frontal end portion 55 radially outwardly. Moreover, the spring windings 56 of the central portion 54 are wound relatively tightly, viz. having extremely small clearances relative to each other, wherein especially the spring windings 56 of the central portion 54 are adjacent to each other. Said spring windings 56 serve especially as a barrier for possible welding spatters which may naturally occur during welding of the cap 24 to the compressed gas chamber 30. Thus, the welding spatters do not reach the area of the propellant chamber 14 and of the propellant 16 present there.

The frontal end portion 55, on the other hand, includes spring windings 57 which are in turn spaced apart from each other so that, in the case of activation of the tubular inflator 100, sufficiently hot ignition particles and/or ignition gases may get from the igniter unit 20 through the spring windings 57 and, resp., through the respective clearances therebetween into the propellant bed of the propellant chamber 14 in order to ignite the propellant bodies 16 as intended.

Figure 2A:
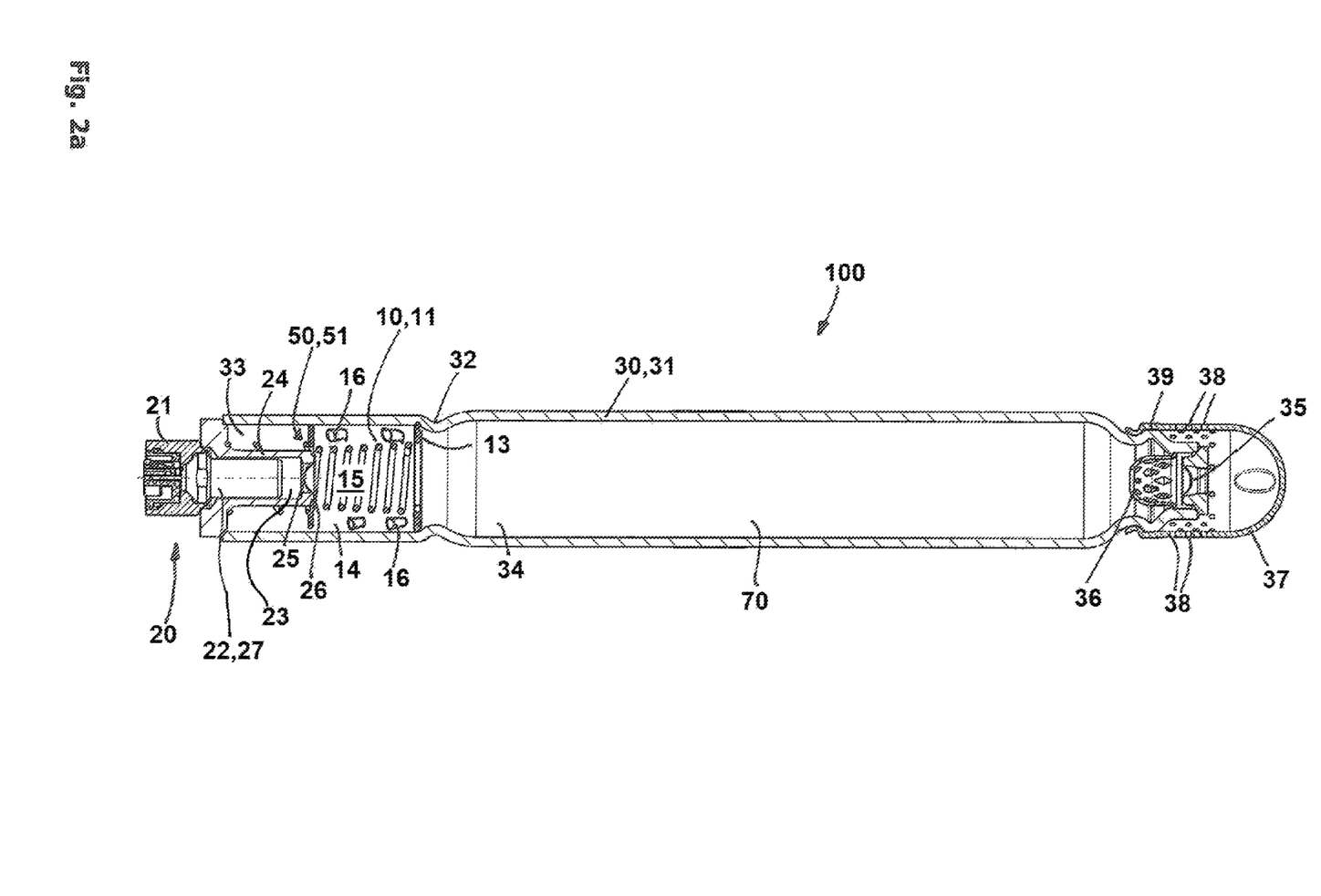
FIG. 2a shows a longitudinal section view across a tubular inflator comprising a propellant cage according to the invention as set forth in a second embodiment of the invention and a packing element according to the invention as set forth in a second embodiment of the invention.
Figure 2B:
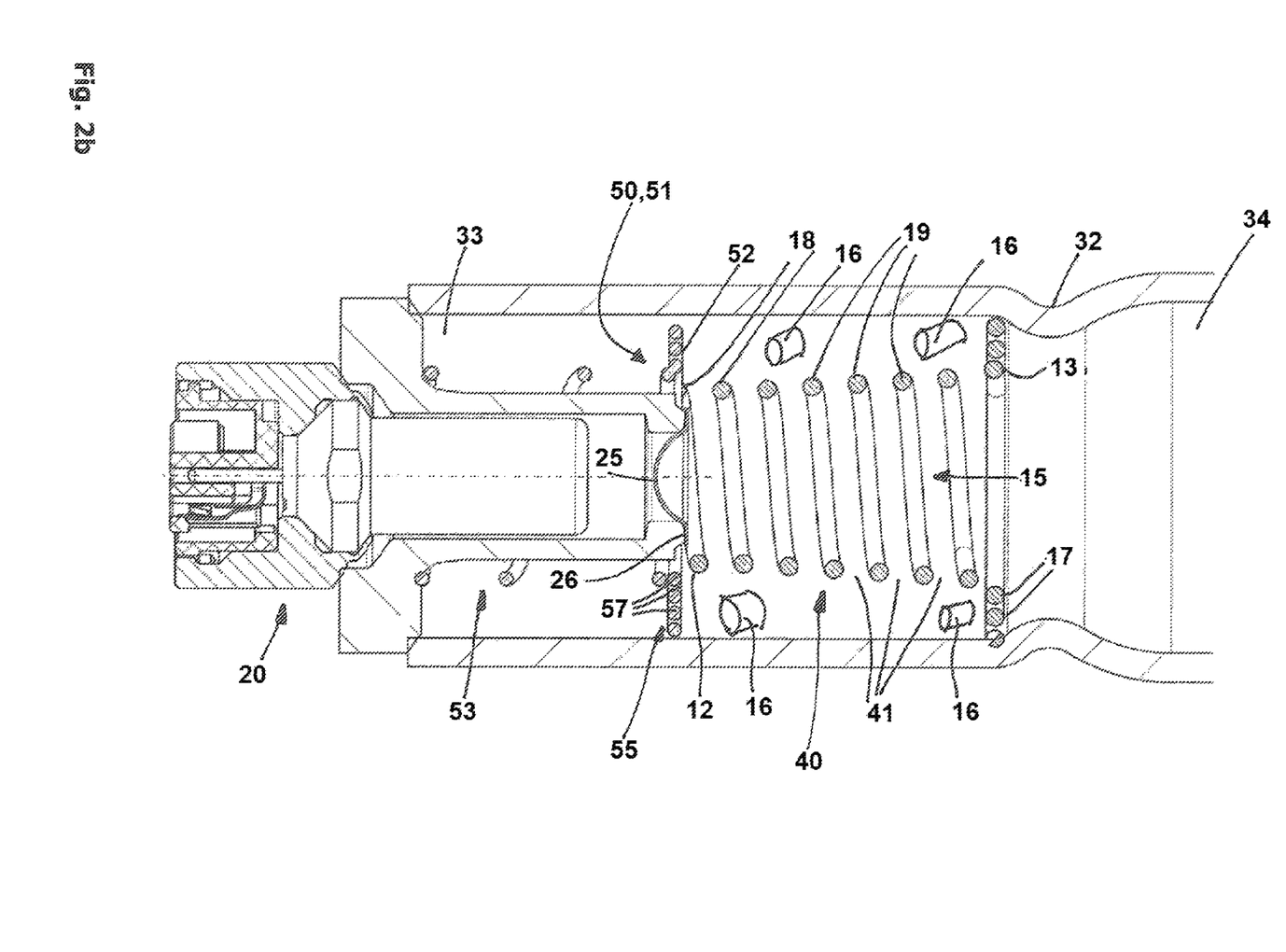

In FIGS. 2a and 2b, another embodiment regarding a propellant cage 10 according to the invention and a packing element 50 according to the invention is shown. The basic structure of the tubular inflator 100 is formed identically to FIG. 1a so that in the following merely the differences concerning the embodiment shown in FIGS. 1a and 1b will be discussed.

The propellant cage 10 in turn is in the form of a propellant cage spiral spring 11. In this case, too, the gas outlet-side end 13 has a larger cross-section than the gas inlet-side end 12. The gas inlet-side end 12 rests directly on the end face 26 of the cap 24. The propellant cage spiral spring 11 is thus clamped between the bead 32 and the cap 24, especially the end face 26 of the cap 24, and is thus axially biased. The gas outlet-side end 13 is formed by three closely adjacent spring windings 17. The central spring portion 40 has a merely slightly outwardly directed conical shape, as compared to the propellant cage spiral spring 11 of FIGS. 1a and 1b, wherein the central spring portion 40 may also include an outer envelope or, resp., an outer shell of a straight circular cylinder. The clearance of the spring windings 19 of said central spring portion 40 in turn forms a spiral-shaped lateral gas outlet opening 41.

The packing spiral spring 51, on the other hand, includes merely two portions. These are an igniter carrier-side portion 53 and a frontal end portion 55. The spring windings 57 of the frontal end portion 55 are formed to be closely and, resp., radially adjacent to each other so that the propellant bed provided in the propellant chamber 14 can be sufficiently fixed. The propellant bed-side end 52 of the packing spiral spring 51 is configured substantially in the same plane as the gas inlet-side end 12 of the propellant cage 10 and, resp., of the propellant cage spiral spring 11. Consequently, the propellant bed-side end 52 of the packing element 50 and the gas inlet-side end 12 of the propellant cage 10 are located substantially in the same plane as the end face 26 of the cap 24. Alternatively, it is possible that the corresponding end areas of the springs 11 and 51 are overlapping over a certain axial length. In other words, in another embodiment of the invention the gas inlet-side end 12 might be inserted in the propellant bed-side end 52 of the packing element 50.

Figure 3A:
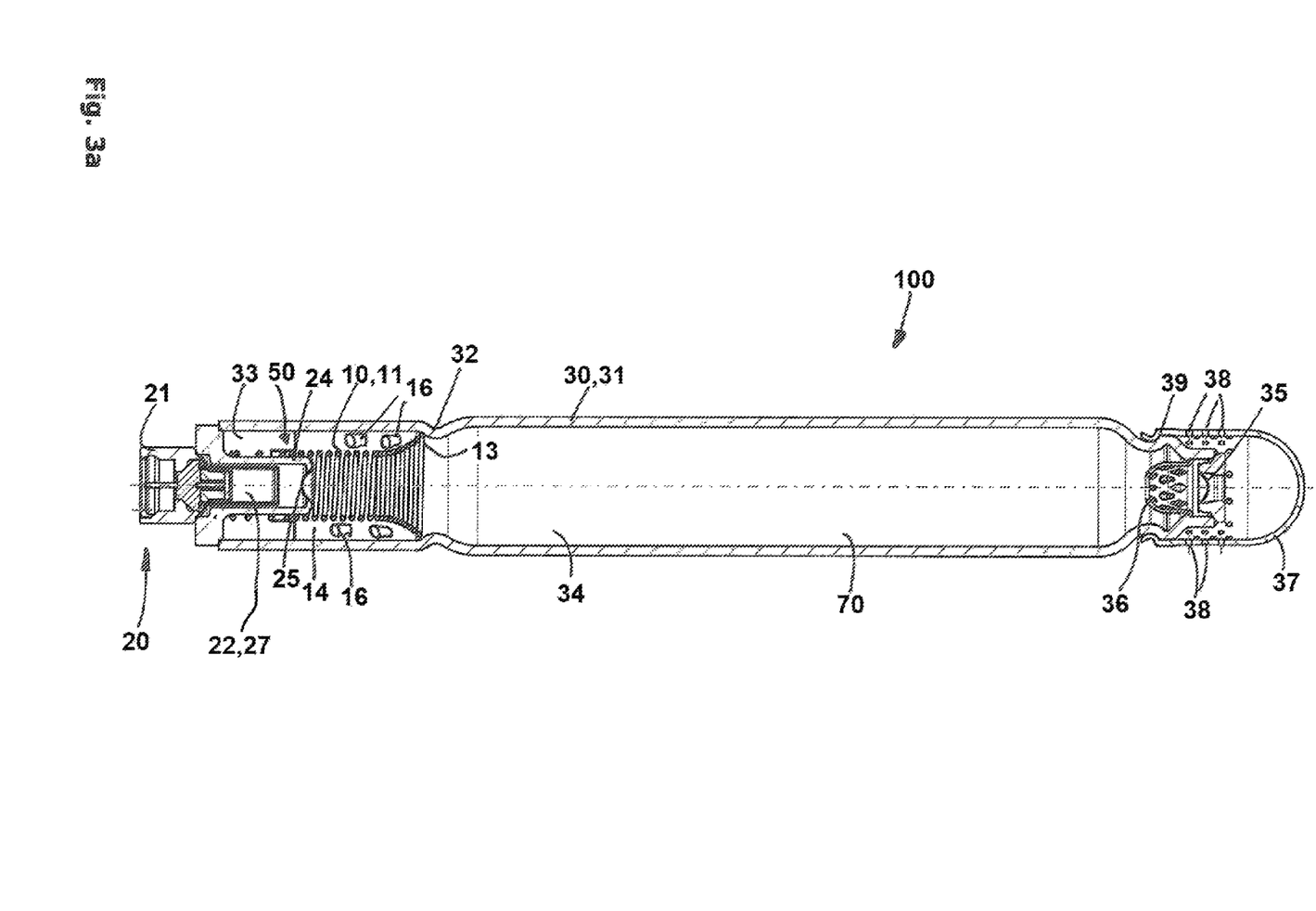
FIG. 3a shows a longitudinal section view across a tubular inflator comprising a propellant cage according to the invention as set forth in a third embodiment of the invention and a packing element according to the invention as set forth in a third embodiment of the invention.
Figure 3B:
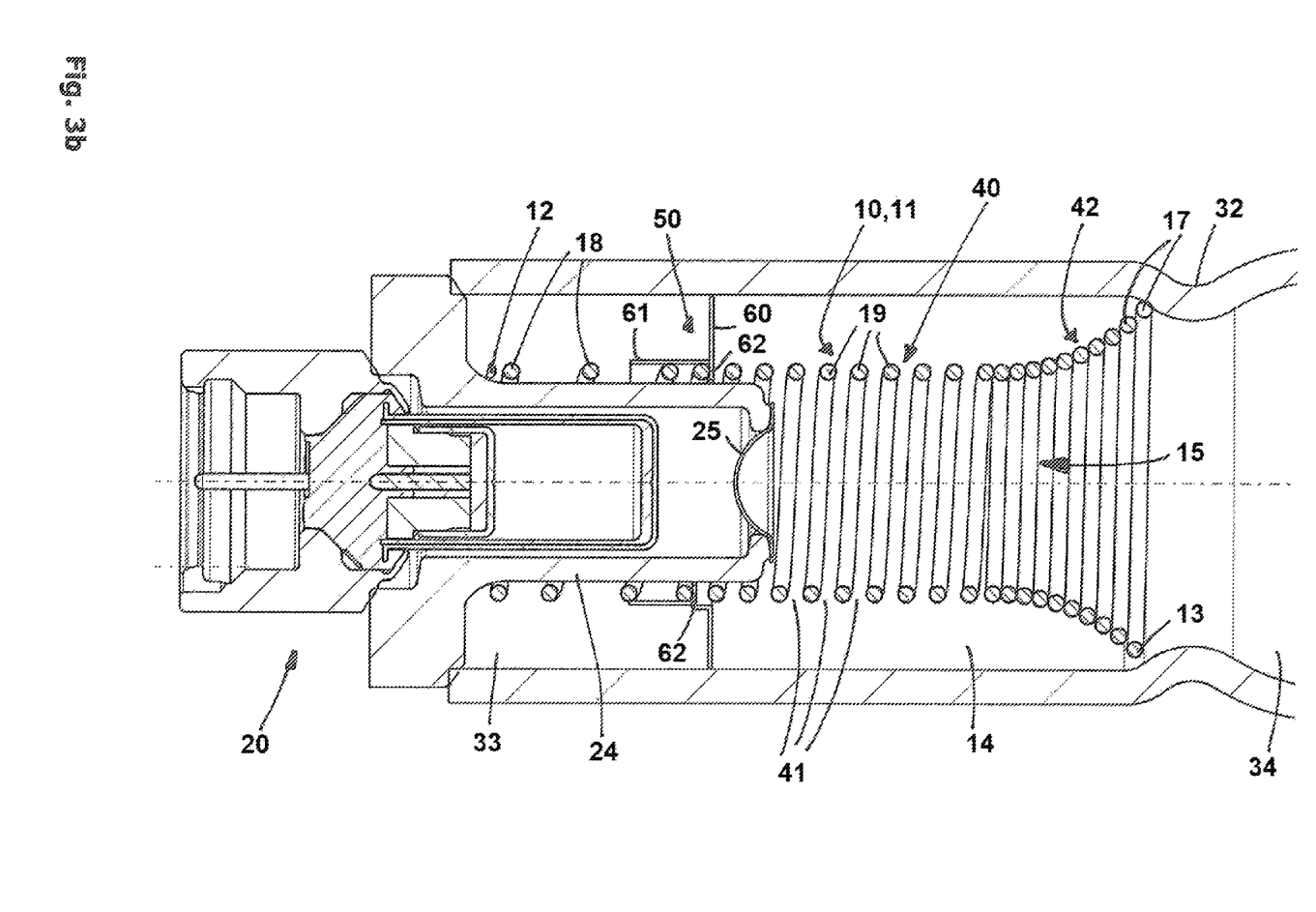
Figure 3C:
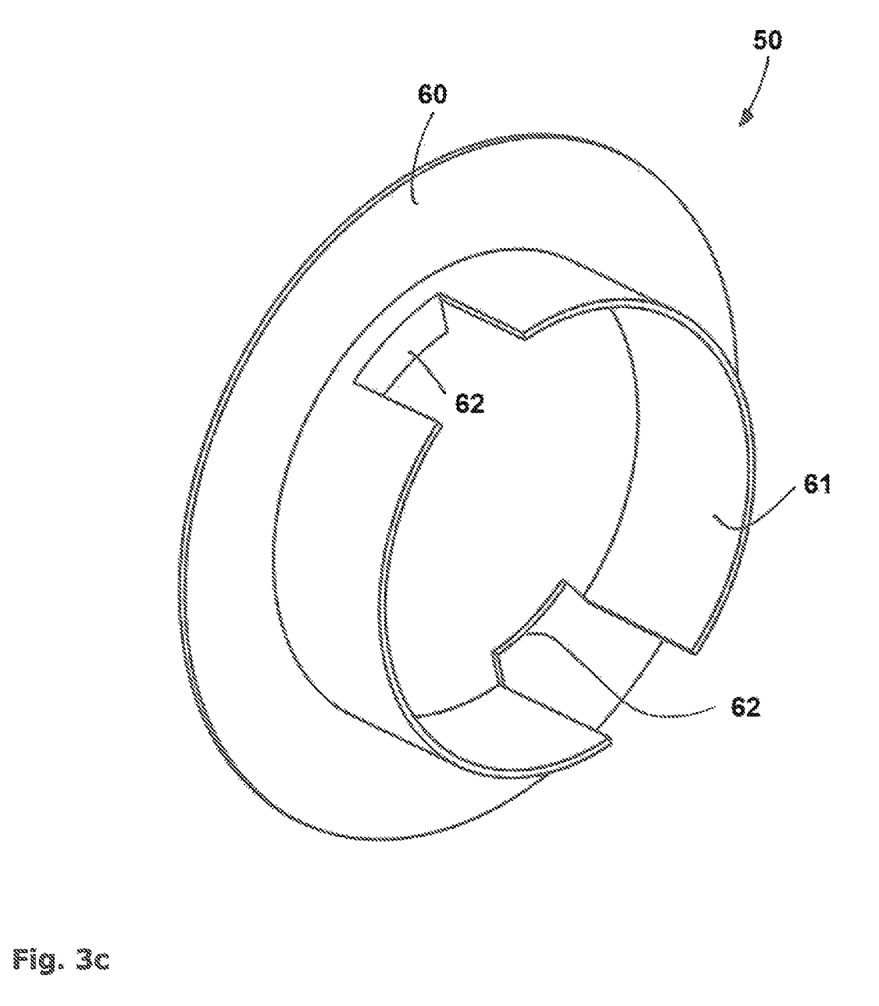
FIG. 3c shows the packing element according to the third embodiment in an enlarged view.

FIGS. 3a-3c illustrate another possible embodiment and the components thereof regarding a tubular inflator 100 according to the invention and a packing element 50 according to the invention. The basic structure corresponds to the tubular inflators 100 shown in FIG. 1a-2b so that hereinafter merely the differences in structure and design will be shown.

The propellant cage 10 is in the form of a propellant cage spiral spring 11. It is evident that said propellant cage spiral spring is funnel-shaped at least in portions and includes a funnel-shaped portion 42. The gas outlet-side end 13 of the propellant cage spiral spring 11 rests on the bead 32. The cap 24 is inserted with the end face 26 into the gas inlet-side end 12 of the propellant cage spiral spring 11. The spring windings 17 in the area of the gas outlet-side end 13 of the propellant cage spiral spring 11 are very tightly wound so that no propellant bodies can enter from the propellant chamber 14 into the second portion 34 of the compressed gas tank 30. Moreover, the shock wave can thus be guided, starting from the inlet-side bursting diaphragm 25, directly into the second portion 34 of the compressed gas tank 30. The central spring portion 40 includes spring windings 19 which are spaced from each other such that ignition gas and, resp., ignition particles may get from the flow passage 15 into the propellant chamber 14. The clearance of the spring windings 19 is designed so that no propellant bodies 16 can penetrate the flow passage 15.

The packing element 50 in this case comprises a radial ring element 60 having an axially extending sleeve 61. The gas inlet-side end 12 of the propellant cage spiral spring 11 is passed through the radial ring element 60 and the axially extending sleeve 61. In order to enable such arrangement regarding the propellant cage spiral spring 11 and the packing element 50, the following assembling procedure is suggested:

The propellant cage spiral spring 11 is placed onto the bead 32. Then the propellant chamber 14 is filled with propellant bodies 16 so that a propellant bed is formed. After filling with propellant bodies, the packing element 50 is screwed onto the gas inlet-side end 12 of the propellant cage spiral spring 11 axially in the direction of the gas outlet-side end 13 of the propellant cage spiral spring 11. The packing element 50 is screwed on until the radial ring element 60 fixes and, resp., mechanically biases the propellant bed as intended.

The packing element 50 further comprises tabs 62 (cf. FIG. 3c in this context) which are in the form of inwardly bent elements of the axially extending sleeve 61. Screwing of the packing element 50 onto the propellant cage spiral spring 11 is facilitated and, resp., enabled in a defined manner due to the tabs 62, with the tabs 62 acting so-to-speak as a screwing aid or screwing guide. In the desired final position of the screwed-on packing element 50 the tabs 62 serve as an axial protection or stop. The axially extending sleeve 61 further serves, during screwing, as a guide element and, in the desired final position of the packing element 50, as a protection and, resp., stabilization for the positioning of the packing element 50.

In addition, the packing element 50 may be provided to comprise exclusively the radial ring element 60 and/or the axially extending sleeve 61.

For assembling a packing element of this type, the propellant cage spiral spring 11 is elongated axially opposed to the direction of the bead 32 after the propellant chamber 14 has been filled with propellant bodies 16. This causes the outside diameter of the propellant cage spiral spring 11 to be reduced in said elongated area so that the packing element 50 can be merely fitted or slid onto said area, which renders a more complicated additional radially directed screwing superfluous. Following elastic relief or slight axial upsetting of the propellant cage spiral spring 11 then would increase the previously reduced outside diameter of the propellant cage spiral spring 11 again in the respective area so that the packing element 50 remains fixed in the final position even without any radially inwardly bent tabs. Subsequently, the housing 31 may be closed by the igniter unit 20.

REFERENCE NUMERALS 10 propellant cage
11 propellant cage spiral spring
12 gas inlet-side end
13 gas outlet-side end
14 propellant chamber
15 flow passage
16 propellant bodies 17 spring winding
18 spring winding
19 spring winding
20 igniter unit
21 igniter carrier
22 igniter
23 igniter chamber
24 cap
25 inlet-side bursting diaphragm
26 end face
27 igniter cap
30 compressed gas tank
31 housing
32 bead
33 first portion of compressed gas tank
34 second portion of compressed gas tank
35 outlet-side bursting diaphragm
36 filter screen
37 diffuser
38 outlet opening
39 diffuser cap
40 central spring portion
41 lateral gas outlet opening
42 funnel-shaped portion
50 packing element
51 packing spiral spring
52 propellant-side end
53 igniter-side portion
54 central portion
55 frontal end portion
56 spring winding
57 spring winding
60 radial ring element
61 axially extending sleeve
62 tab
70 gas chamber
100 tubular inflator

The invention claimed is:

1. A packing element (50) for a tubular inflator (100) for fixing a propellant bed located in a propellant chamber (14) of the tubular inflator (100), wherein the packing element (50) is formed at a propellant bed-side end (52) so as to receive and partially enclose and/or support a propellant cage (10);

wherein the the propellant cage (10) forms a propellant chamber (14) and a flow passage (15) of the tubular inflator (100), wherein the propellant cage (10) is in the form of a propellant cage spiral spring (11) having a gas inlet-side end (12) and a gas outlet-side end (13), wherein the gas inlet-side end (12) has a smaller cross-section than the gas outlet-side end (13);

wherein a configuration of the packing element is a packing spiral spring (51) which includes plural portions in an axial direction having different diameters and/or clearances of spring windings; and wherein the packing spiral spring (51) includes a first igniter carrier-side portion (53), a second central portion (54) and a frontal end portion (55), the central portion being tapered (54) and being widened in the direction of the frontal end portion (55) and having a smaller spring winding clearance as compared to the igniter carrier-side portion (53).

2. The packing element (50) according to claim 1, wherein a clearance of spring windings (17) in the area of the gas outlet-side end (13) is smaller than at least one of a clearance of spring windings (18) in the area of the gas inlet-side end (12) and a clearance of spring windings (19) of a central spring portion (40) of the propellant cage (10), wherein the propellant cage (10) at least in portions has a funnel-shaped (42) or trumpet-shaped design.

3. The packing element (50) according to claim 1, wherein the spring winding clearance in the frontal end portion (55) is larger than the spring winding clearance in the central portion (54) of the packing spiral spring (51) and is smaller than the spring winding clearance of the first igniter carrier-side portion (53).

4. The packing element (50) according to claim 1, further comprising a radial ring element (60) at which an axially extending sleeve (61) is formed, wherein the sleeve (61) has at least one radially inwardly extending tab (62).

5. A tubular inflator (100) for an airbag module, comprising a tubular housing (31) and a propellant cage (10, 11) forming a propellant chamber (14) and a flow passage (15) of the tubular inflator (100), wherein the propellant cage (10) is in the form of a propellant cage spiral spring (11) having a gas inlet-side end (12) and a gas outlet-side end (13), wherein the gas inlet-side end (12) has a smaller cross-section than the gas outlet-side end (13), wherein the propellant cage (10, 11) is arranged inside the tubular housing (31) and the tubular housing (31) delimits, at least in portions, the propellant chamber (14) and forms the flow passage (15), wherein the tubular inflator further comprises a packing element (50) according to claim 1.

6. The tubular inflator (100) according to claim 5, wherein the gas outlet-side end (13) of the propellant cage (10, 11) rests on a bead (32) of the tubular housing (31) of the tubular inflator (100), wherein the bead (31) is formed in at least one of an igniter-side front third, an igniter-side front quarter, and an igniter-side front fifth, of the tubular housing (31).

7. The tubular inflator (100) according to claim 5, wherein the gas inlet-side end (12) of the propellant cage (10, 11) and the propellant bed-side end (52) of the packing element (50, 51) are formed substantially in a joint plane.

8. The tubular inflator (100) according to claim 5, wherein the propellant cage (10) and the packing element (50) are positioned to be overlapping each other at least in portions in the axial direction.

9. The tubular inflator (100) according to claim 5, wherein the packing element (50, 51) is at least one of screwed, fitted, and clipped onto the propellant cage (10, 11).

10. The tubular inflator (100) according to claim 5, wherein the clearances of the spring windings of the propellant cage spiral spring (11) are configured relative to propellant bodies (16) of the propellant bed in such way that the propellant bodies (16) cannot enter into the flow passage (15) and/or in that the tubular inflator (100) is operable according to a shock wave principle.

11. An airbag module comprising a tubular inflator (100), an airbag inflatable by the tubular inflator (100) and a securing unit for attaching the airbag module to a vehicle, wherein the tubular inflator (100) is configured according to claim 5.

12. A vehicle safety system comprising a tubular inflator (100), an airbag inflatable by the tubular inflator (100) as part of an airbag module, and an electronic control unit by means of which the tubular inflator (100) can be activated when a trigger situation is given, wherein the tubular inflator (100) is configured according to claim 5.

13. A method of operating the tubular inflator (100) according to claim 5, comprising the following steps of:

triggering an igniter unit (20) for generating ignition gas inside an ignition chamber (23);

axially introducing the ignition gas into the flow passage (15) encompassed by the propellant cage (10, 11);

discharging part of the ignition gas via at least one lateral gas flow opening (41) of the propellant cage (10, 11) into the propellant chamber (14) radially inwardly delimited by the propellant cage (10, 11);

igniting propellant bodies (16) within the propellant chamber (14) by the ignition gas, wherein propellant gas is generated; and passing the propellant gas out of the propellant chamber (14) into a gas chamber (70).

14. The method according to claim 13, wherein during the step of axially introducing the ignition gas, a shock wave front is initiated which flows in the direction of a longitudinal axis directly through the gas chamber (70) and opens a bursting element (35) formed at a longitudinally axial end of the gas chamber (70).

15. A method of manufacturing a tubular inflator (100) according to claim 5, comprising the following steps of:

inserting the propellant cage (10, 11) into the tubular housing (31) of the tubular inflator in such way that the gas outlet-side end (13) of the propellant cage (10, 11) rests on a bearing element;

filling propellant bodies (16) into a space (14) formed by the propellant cage (10, 11) and the tubular housing (31) and forming the propellant bed;

placing the packing element (50, 51) onto the propellant bed and axially biasing the propellant bed, wherein the packing element (50, 51) is designed as part of an assembly unit and is placed, together with the assembly unit, onto the propellant bed.

16. The method according to claim 15, further comprising the step of filling a gas chamber (70) with a gas or a gas mixture.

17. The method according to claim 15, wherein the step of placing the packing element (50, 51) onto the propellant bed and axially biasing the propellant bed comprises at least one of screwing, fitting and clipping the packing element (50, 51) onto the propellant cage (10, 11).

18. The method according to claim 15, further comprising the step of elongating the gas inlet-side end (12) of the propellant cage (11) in a direction opposed to the bearing element.

19. The method according to claim 18, wherein the step of elongating the gas inlet-side end (12) of the propellant cage (11) comprises using a tool comprising a stopper device so that during elongation the propellant cage (11) is held in position relative to the bearing element.

20. A tubular inflator (100) comprising the packing element (50) of claim 1.

21. An airbag module comprising the tubular inflator (100) of claim claim 20.

22. A vehicle safety system comprising the airbag module of claim claim 21.

23. A method of manufacturing a tubular inflator (100) for an airbag module, comprising a tubular housing (31) and a propellant cage (10, 11) forming a propellant chamber (14) and a flow passage (15) of the tubular inflator (100), wherein the propellant cage (10) is in the form of a propellant cage spiral spring (11) having a gas inlet-side end (12) and a gas outlet-side end (13), wherein the gas inlet-side end (12) has a smaller cross-section than the gas outlet-side end (13), wherein the propellant cage (10, 11) is arranged inside the tubular housing (31) and the tubular housing (31) delimits, at least in portions, the propellant chamber (14) and forms the flow passage (15), wherein the tubular inflator further comprises a packing element (50) for fixing a propellant bed located in the propellant chamber (14) of the tubular inflator (100), wherein the packing element (50) is formed at a propellant bed-side end (52) so as to receive and partially enclose and/or support the propellant cage (10), and wherein the propellant cage (10) forms the propellant chamber (14) and the flow passage (15) of the tubular inflator (100), wherein the method comprising the following steps of:

inserting the propellant cage (10, 11) into the tubular housing (31) of the tubular inflator in such way that the gas outlet-side end (13) of the propellant cage (10, 11) rests on a bearing element;

filling propellant bodies (16) into a space (14) formed by the propellant cage (10, 11) and the tubular housing (31) and forming the propellant bed;

placing the packing element (50, 51) onto the propellant bed and axially biasing the propellant bed, wherein the packing element (50, 51) is designed as part of an assembly unit and is placed, together with the assembly unit, onto the propellant bed; and elongating the gas inlet-side end (12) of the propellant cage (11) in a direction opposed to the bearing element.

24. The method according to claim 23, wherein the step of elongating the gas inlet-side end (12) of the propellant cage (11) comprises using a tool comprising a stopper device so that during elongation the propellant cage (11) is held in position relative to the bearing element.

* * * * *